(12) United States Patent
Li et al.

(10) Patent No.: US 12,197,874 B2
(45) Date of Patent: Jan. 14, 2025

(54) INFORMATION PROCESSING METHOD, AND METHOD AND APPARATUS FOR LOCATING SUB-CONTROL CHART IN CONTROL CHART

(71) Applicant: Siemens Aktiengesellschaft, Munich (DE)

(72) Inventors: Dong Li, Beijing (CN); Xiao Bo Yang, Beijing (CN); Lei Xiong, Beijing (CN); Tong Zhou Wang, Beijing (CN); Chuan Yu Zhang, Beijing (CN); Yao Lei Kang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/565,221

(22) PCT Filed: May 31, 2021

(86) PCT No.: PCT/CN2021/097423
§ 371 (c)(1),
(2) Date: Nov. 29, 2023

(87) PCT Pub. No.: WO2022/252056
PCT Pub. Date: Dec. 8, 2022

(65) Prior Publication Data
US 2024/0256783 A1 Aug. 1, 2024

(51) Int. Cl.
*G06F 40/30* (2020.01)
*G06F 16/332* (2019.01)

(52) U.S. Cl.
CPC .......... *G06F 40/30* (2020.01); *G06F 16/3329* (2019.01)

(58) Field of Classification Search
CPC .............................. G06F 16/3329; G06F 40/30
See application file for complete search history.

(56) References Cited

U.S. PATENT DOCUMENTS

| 9,471,695 B1 * | 10/2016 | Gallup ................ G01C 21/26 |
| 10,943,072 B1 | 3/2021 | Jaganmohan ........... G06F 40/30 |
| 2011/0296330 A1 | 12/2011 | Shi ............................... 715/771 |

(Continued)

FOREIGN PATENT DOCUMENTS

| CN | 106 292 302 | 1/2017 | |
| WO | 2020/198249 A1 | 10/2020 | ........... G05B 19/042 |
| WO | 2021 087373 | 5/2021 | |

OTHER PUBLICATIONS

Search Report for International Application No. PCT/CN2021/097423, 12 pages.

(Continued)

*Primary Examiner* — Eric Yen
(74) *Attorney, Agent, or Firm* — Slayden Grubert Beard PLLC

(57) ABSTRACT

The teachings of the present disclosure include information processing methods. Some embodiments include: constructing a knowledge graph of a target physical world; constructing a control chart of the target physical world; and adding annotation information to each function block in the control chart, and establishing one-to-one mapping between function blocks and entities in the knowledge graph, to establish mapping between the control chart and the knowledge graph.

10 Claims, 7 Drawing Sheets

(56) References Cited

U.S. PATENT DOCUMENTS

| | | | | |
|---|---|---|---|---|
| 2012/0253790 A1* | 10/2012 | Heck | .................... | G06F 16/367 |
| | | | | 707/769 |
| 2014/0280877 A1* | 9/2014 | Koulomzin | ....... | G06F 16/24578 |
| | | | | 709/224 |
| 2015/0127632 A1* | 5/2015 | Khaitan | .............. | G06F 16/9535 |
| | | | | 707/755 |
| 2016/0103932 A1* | 4/2016 | Sathish | .................. | G06N 5/025 |
| | | | | 715/767 |
| 2018/0247209 A1* | 8/2018 | Lecue | ..................... | G06F 30/20 |
| 2019/0303498 A1 | 10/2019 | Saha | ....................... | G06F 17/30 |
| 2022/0171891 A1 | 6/2022 | Sinha et al. | | |
| 2023/0028381 A1* | 1/2023 | Meyerzon | ........... | G06F 16/3329 |

OTHER PUBLICATIONS

Extended European Search Report, Application No. 21943432.1, 8 pages.

\* cited by examiner

INFORMATION PROCESSING METHOD, AND METHOD AND APPARATUS FOR LOCATING SUB-CONTROL CHART IN CONTROL CHART

CROSS-REFERENCE TO RELATED APPLICATIONS

This application is a U.S. National Stage Application of International Application No. PCT/CN2021/097423 filed May 31, 2021, which designates the United States of America, the contents of which are hereby incorporated by reference in their entirety.

TECHNICAL FIELD

The present disclosure generally relates to the field of automation technologies. Various embodiments of the teachings herein include information processing methods and/or systems, as well as method and/or apparatus for locating a target sub-control chart in a control chart.

BACKGROUND

Development and debugging of control charts such as a function block diagram (Function Block Diagram, FBD) and a continuous function chart (Continuous Function Chart, CFC) is a complex task for a developer, especially when the control charts are very complex. In other words, there may be a large quantity of function blocks and complex logical relationships.

Controllers are used in application fields as building automation, industrial automation, process control, and OEM devices. A large amount of knowledge and experience in this field is required for developers to develop and debug the control charts, and the developers need to convert their knowledge in this field into the control charts, and monitor and tune the controllers during runtime. On the other hand, complexity of development and debugging of the control charts may lead to low efficiency, resulting in losses in business.

Currently, if the developer only wants to modify some parameters of a specific function block (Function Block, FB) in the control chart or monitor a status of a specific device, the developer needs to traverse all FBs to find a location of an FB that needs to be changed. An FB unrelated to the current FB is also monitored and displayed. In the method, the developer needs to spend a large amount of time traversing the FBs. In other words, such method reduces development efficiency of the control chart and increases workload of the developer, especially in a case of nested FB.

SUMMARY

A brief overview of the present disclosure is given below to provide a basic understanding of certain aspects of the present disclosure. It should be understood that this summary is not an exhaustive overview of the present disclosure. It is not intended to determine key or important parts of the present disclosure, nor is it intended to limit the scope of the present disclosure. The purpose is merely to present some concepts in a simplified form as a prelude to the more detailed description that is discussed later.

In view of this, the present disclosure provides a solution, to map a knowledge graph of the real-world to an entire control chart in an engineering tool. Through such mapping, a user can further query the knowledge graph by using a natural language, and then determine, based on an entity of the found knowledge graph, a matched target sub-control chart in the control chart to which the knowledge graph is mapped. For example, some embodiments include an information processing method, comprising: constructing a knowledge graph of a target physical world; constructing a control chart of the target physical world; and adding annotation information to each function block in the control chart, and establishing one-to-one mapping between function blocks and entities in the knowledge graph, to establish mapping between the control chart and the knowledge graph.

As another example, some embodiments include a method for locating a target sub-control chart in a control chart, comprising: an input information receiving step: receiving natural language query information inputted by a user, and translating the natural language query information into semantic information; an entity matching step: querying at least one entity matching the semantic information in a knowledge graph of a target physical world; and a sub-control chart determining step: determining a sub-control chart matching the at least one entity in a control chart to which the knowledge graph is mapped, wherein the sub-control chart comprises at least one function block and a logical relationship between the function blocks.

In some embodiments, when the determined sub-control chart does not meet a need of the user, the method further comprises a cyclical control step: repeatedly performing the input information receiving step, the entity matching step, and the sub-control chart determining step for a next layer of the knowledge graph until no query information is received.

In some embodiments, the natural language information comprises voice information or text information.

In some embodiments, the method further comprises a function block displaying step: displaying the function blocks in the determined sub-control chart in a hierarchical structure.

As another example, some embodiments include an apparatus (700) for locating a target sub-control chart in a control chart, comprising: an input information receiving unit (702), configured to receive natural language query information inputted by a user, and translate the natural language query information into semantic information; an entity matching unit (704), configured to query at least one entity matching the semantic information in a knowledge graph of a target physical world; and a sub-control chart determining unit (706), configured to determine a sub-control chart matching the at least one entity in a control chart to which the knowledge graph is mapped, wherein the sub-control chart comprises at least one function block and a logical relationship between the function blocks.

In some embodiments, when the determined sub-control chart does not meet a need of the user, the apparatus further comprises: a cyclical control unit, configured to control the input information receiving unit, the entity matching unit, and the sub-control chart determining unit to perform an operation for a next layer of the knowledge graph until no query information inputted is received.

In some embodiments, the natural language information comprises voice information or text information.

In some embodiments, the apparatus further comprises a function block displaying unit, configured to display the function blocks in the determined sub-control chart in a hierarchical structure.

As another example, some embodiments include a computing device (800), comprising: at least one processor (802); and a memory (804), coupled to the at least one processor (802), wherein the memory is configured to store instructions, the instructions, when executed by the at least one processor (802), causing the processor (802) to perform one or more of the methods described herein.

As another example, some embodiments include a non-transitory machine-readable storage medium, storing executable instructions, the instructions, when executed, causing a machine to perform one or more of the methods described herein.

As another example, some embodiments include a computer program product, wherein the computer program product is tangibly stored in a computer-readable medium and comprises computer-executable instructions, the computer-executable instructions, when executed, causing at least one processor to perform one or more of the methods described herein.

BRIEF DESCRIPTION OF THE DRAWINGS

Referring to the descriptions of the embodiments of the present disclosure in combination with the accompanying drawings, the foregoing and other objectives, features, and potential advantages of the teachings of the present disclosure may be more easily understood. Components in the accompanying drawings are merely used for demonstrating the principle of the present disclosure. In the accompanying drawings, the same or similar technical features or components may be represented by using the same or similar reference numerals. In the accompanying drawings.

Figure 1:
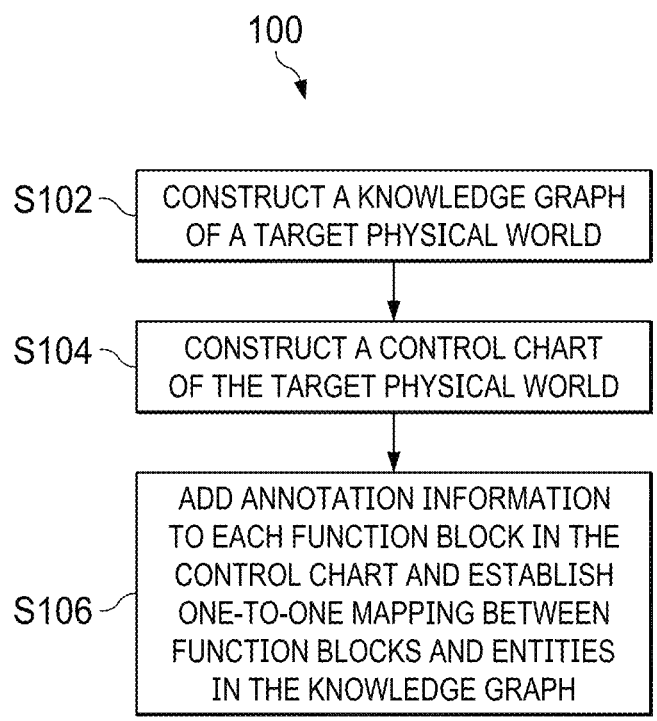
FIG. 1 is a flowchart of an exemplary process of an information processing method incorporating teachings of the present disclosure.

| Reference numerals are as follows: | |
|---|---|
| 100: Information processing method | S102, S104, S106: Steps |
| 200: Knowledge graph | 300: Control chart |
| 400: Method for locating a target sub-control chart in a control chart | S402, S404, S406, S408, and S410: Steps |
| 500: Hierarchically displayed knowledge graph | 600: Sub-control chart |
| 700: Apparatus for locating a | 702: Input information |

| Reference numerals are as follows: | |
|---|---|
| target sub-control chart in a control chart | receiving unit |
| 704: Entity matching unit | 706: Sub-control chart determining unit |
| 708: Cyclical control unit | 710: Function block displaying unit |
| 800: Computing device | 802: Processor |
| 804: Memory | |

DETAILED DESCRIPTION

In some embodiments of the present disclosure, an information processing method includes: constructing a knowledge graph of a target physical world; constructing a control chart of the target physical world; and adding annotation information to each function block in the control chart, and establishing one-to-one mapping between function blocks and entities in the knowledge graph, to establish mapping between the control chart and the knowledge graph. In this way, the knowledge graph of the real-world and the entire control chart in the engineering tool are mapped.

In some embodiments of the present disclosure, a method for locating a target sub-control chart in a control chart includes: an input information receiving step: receiving natural language query information inputted by a user, and translating the natural language query information into semantic information; an entity matching step: querying at least one entity matching the semantic information in a knowledge graph of a target physical world; and a sub-control chart determining step: determining a sub-control chart matching the at least one entity in a control chart to which the knowledge graph is mapped, where the sub-control chart includes at least one function block and a logical relationship between the function blocks.

In some embodiments, when the determined sub-control chart and the at least one function block and the logical relationship between the function blocks included in the sub-control chart do not meet a need of the user, the method further includes a cyclical control step: repeatedly performing the input information receiving step, the entity matching step, and the sub-control chart determining step for a next layer of the knowledge graph until no query information is received.

In some embodiments of the present disclosure, the natural language information includes voice information or text information.

In some embodiments, the method further includes: a function block displaying step: displaying the function blocks in the determined sub-control chart in a hierarchical structure.

In some embodiments of the present disclosure, an apparatus for locating a target sub-control chart in a control chart is provided, including: an input information receiving unit, configured to receive natural language query information inputted by a user, and translate the natural language query information into semantic information; an entity matching unit, configured to query at least one entity matching the semantic information in a knowledge graph of a target physical world; and a sub-control chart determining unit, configured to determine a sub-control chart matching the at least one entity in a control chart to which the knowledge graph is mapped, where the sub-control chart includes at least one function block and a logical relationship between the function blocks.

In some embodiments, when the determined sub-control chart does not meet a need of the user, the apparatus further includes: a cyclical control unit, configured to control the input information receiving unit, the entity matching unit, and the sub-control chart determining unit to perform an operation for a next layer of the knowledge graph until no query information is received.

In some embodiments, the natural language information includes voice information or text information.

In some embodiments, the apparatus further includes: a function block displaying unit, configured to display the function blocks in the determined sub-control chart in a hierarchical structure.

In some embodiments of the present disclosure, a computing device includes: at least one processor; and a memory coupled to the at least one processor, where the memory is configured to store instructions, the instructions, when executed by the at least one processor, causing the processor to perform the method as described above.

In some embodiments of the present disclosure, a non-transitory machine-readable storage medium stores executable instructions, the executable instructions, when executed, causing a machine to perform the method as described above.

In some embodiments of the present disclosure, a computer program includes computer-executable instructions, the computer-executable instructions, when executed, causing at least one processor to perform the method described above.

In some embodiments of the present disclosure, a computer program product is tangibly stored on a computer-readable medium and includes computer-executable instructions, the computer-executable instructions, when executed, causing at least one processor to perform the method as described above.

The knowledge graph and the overall control chart in the engineering tool are mapped in the information processing methods incorporating teachings of the present disclosure, to provide a simple, feasible, and efficient method for continuous development of the control chart. The natural language is used to query a database of the knowledge graph, a sub-control chart related to a to-be-performed development activity can be automatically found in the control chart, and in this way, the developer can efficiently locate a concerned sub-control chart in the development activity, and the developer can focus on the FB of the concerned sub-control chart without being interfered by another unrelated FB, thereby improving the efficiency of development and debugging of the control chart.

In addition, the FB of the determined sub-control chart is displayed in a hierarchical structure, so that the configuration and debugging activities can be clearer and more intuitive.

It should be understood that, discussion of the implementations is merely intended to make a person skilled in the art better understand and implement the subject described in this disclosure, and is not intended to limit the protection scope of the claims, the applicability, or examples. Changes may be made to the functions and arrangements of the discussed elements without departing from the protection scope of the content of the present disclosure. Various processes or components may be omitted, replaced, or added in each example according to requirements. For example, the described method may be performed according to a sequence different from the sequence described herein, and steps may be added, omitted, or combined. In addition, features described in some examples may also be combined in other examples.

As used in this disclosure, the term "include" and variants thereof represent open terms, and means "include but is not limited to". The term "based on" represents "at least partially based on". The terms "one embodiment" and "an embodiment" represent "at least one embodiment". The term "another embodiment" represents "at least one another embodiment". The terms "first", "second", and the like may represent different objects or the same object. Other definitions may be included explicitly or implicitly in the following. Unless otherwise clearly specified, the definition of one term is consistent in the entire specification.

To resolve the foregoing problems, the present disclosure provides a solution, to map a knowledge graph of the real-world to an entire control chart in an engineering tool. Through such mapping, a user can further query the knowledge graph by using a natural language, and then determine, based on an entity of the found knowledge graph, a matched target sub-control chart in the control chart to which the knowledge graph is mapped.

The following specifically describes an example information processing method, and a method and an apparatus for locating a target sub-control chart in a control chart according to the embodiments of the present disclosure with reference to the accompanying drawings. FIG. 1 shows a flowchart of an exemplary process of an information processing method 100 incorporating teachings of the present disclosure.

Step S102: Construct a knowledge graph of a target physical world. First, a target physical world is selected based on an actual need. Herein, the physical world may be, for example, a building, a factory, or the like. The method according to the present disclosure imposes no limitation on a specific type of the target physical world.

Figure 2:
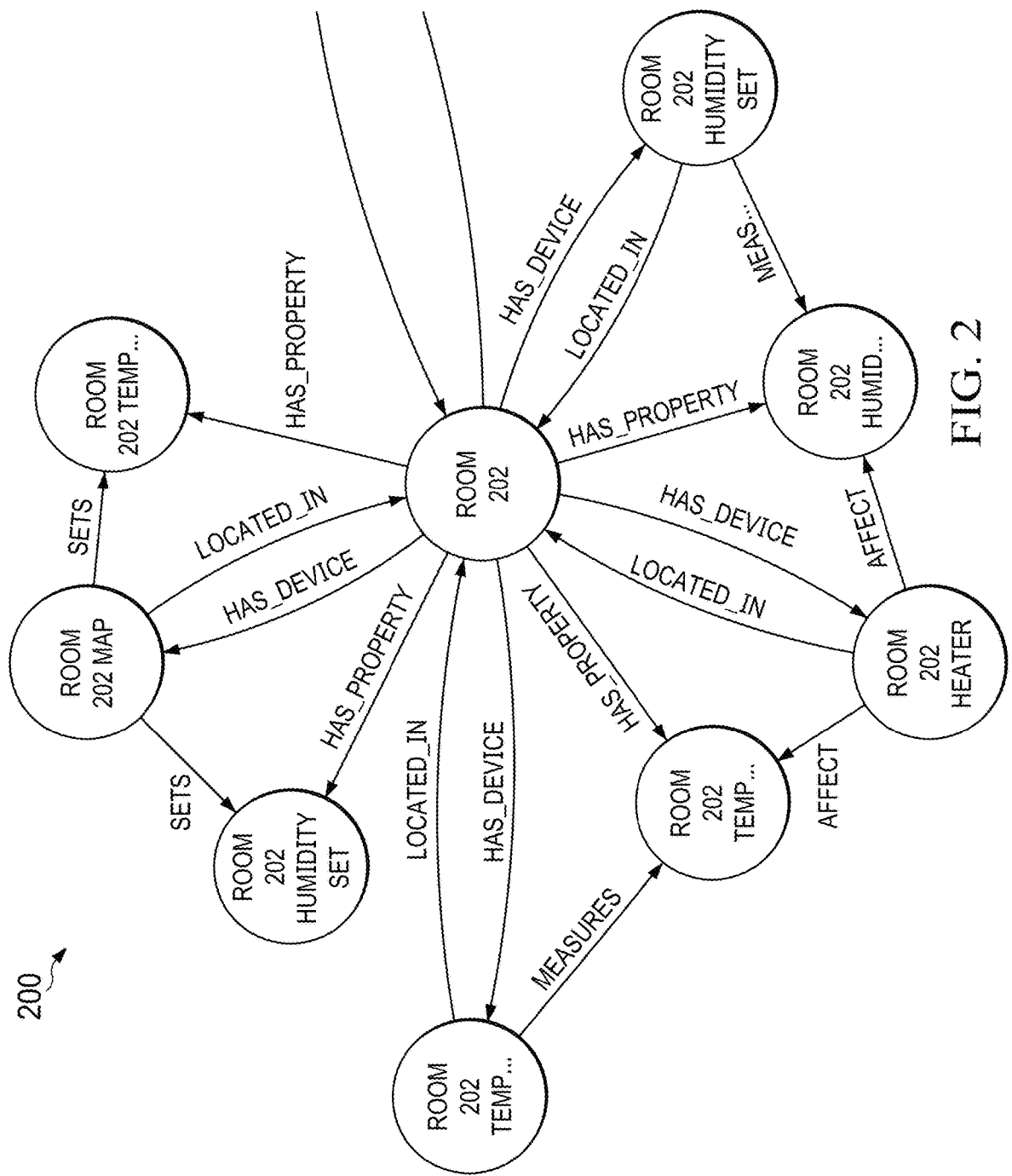
FIG. 2 is a schematic diagram of a knowledge graph of a building incorporating teachings of the present disclosure.

FIG. 2 is a schematic diagram of a knowledge graph 200 of a building. The knowledge graph represents a set of entities and a relationship between the entities. Each node in the knowledge graph represents one entity. The entity is, for example, an object, an event, or an abstract concept in the physical world. For example, in the knowledge graph shown in FIG. 2, a room 202 and a room 202 heater are objects, and a relationship thereof is "LOCATED_IN (located in)" and "HAS_DEVICE (has a device)" and is denoted by a line. Abstract concepts are, for example, condition information such as temperature and humidity of the Room (room). The event is, for example, turning on or off the Heater (heater) or the like. A person skilled in the art can construct the knowledge graph of the target physical world. The methods described herein impose no limitation on the specific method of constructing the knowledge graph. Details are not described herein.

Step S104: Construct a control chart of the target physical world. The control chart is a function block diagram (Function Block Diagram, FBD) of the target physical world, or referred to as a continuous function chart (Continuous Function Chart, CFC).

Figure 3:
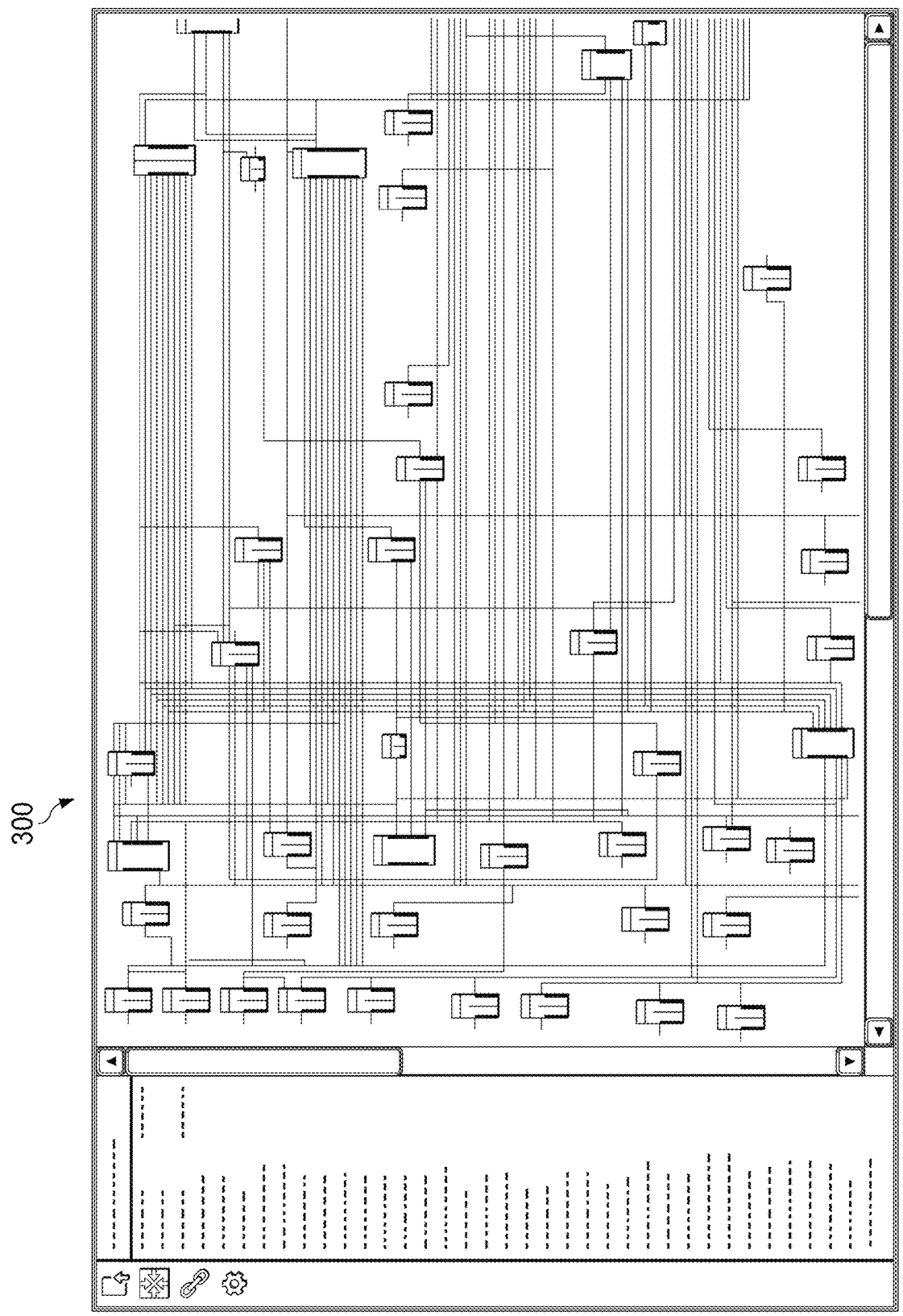
FIG. 3 is a schematic diagram of a control chart of building automation incorporating teachings of the present disclosure.

For example, FIG. 3 is a schematic diagram of a control chart 300 of building automation. It can be seen that the control chart is very huge, and includes hundreds of FBs (Function Block, function block), and intricate logical connections between the FBs. FIG. 3 is only a schematic diagram of the control chart. The teachings of the present disclosure does not focus on specific details of each function block in FIG. 3. All aspects of all devices in the entire building, such as air conditioning, lighting, security, and fire safety, may be controlled by using the control chart. A person skilled in the art can construct the control chart of the target physical world in the engineering tool such as an integrated development environment (Integrated Development Environment, IDE) as required. The teachings of the present disclosure also imposes no limitation on the specific method of constructing the control chart.

Step S106: Add annotation information to each function block in the control chart, and establish one-to-one mapping between function blocks and entities in the knowledge graph, to establish mapping between the control chart and the knowledge graph. The annotation information is added to the FB of the control chart, to indicate which entity in the knowledge graph is associated with the FB. Each FB is annotated, so that one-to-one mapping between each FB in the control chart and each entity in the knowledge graph can be established. Through such mapping, the relationship between the FBs can also be mapped to the relationship between the entities, thereby establishing mapping between the control chart and the knowledge graph.

In the information processing method 100, mapping between the control chart and the knowledge graph of the target physical world is established. As mentioned above, when a developer wants to perform a specific operation, for example, developing a control chart of a specific part of the physical world, or the developer wants to debug one or more FBs in the control chart, modify one or more FB parameters, or monitor a status of a specific device, the developer needs to select one or more FBs related to performing of the operation in the control chart.

After the mapping between the control chart and the knowledge graph is established, the user can input the target operation in natural language, and the natural language is translated into semantic information in the method according to the present disclosure. A matched entity may be retrieved in the knowledge graph by using the semantic information. Sub-control charts corresponding to these entities are found in the entire control chart. The user can directly operate the found FB of the sub-control chart without a requirement for traversing FBs in the entire control chart, thereby improving efficiency of development and debugging.

Figure 4:
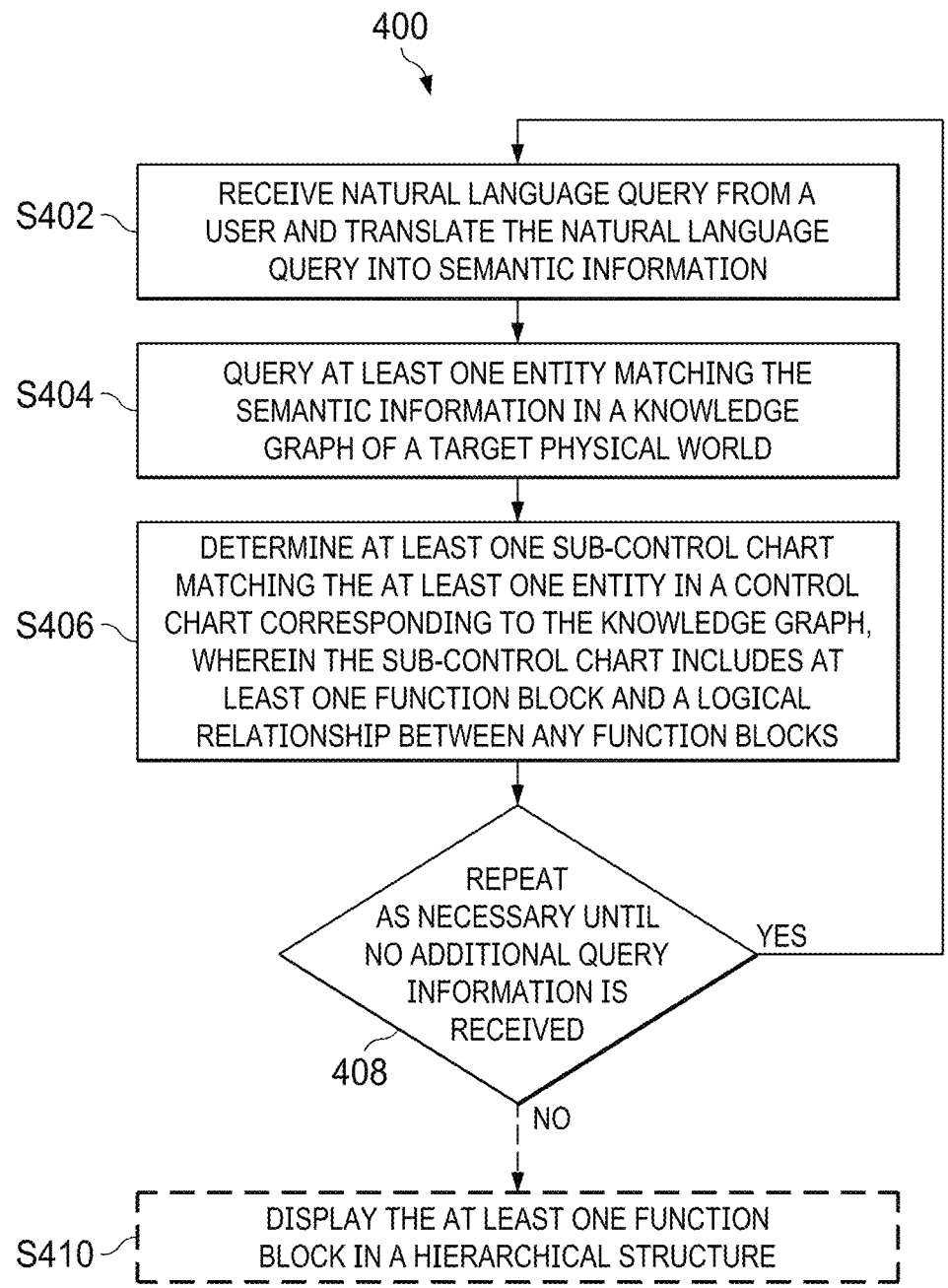
FIG. 4 is a flowchart of an exemplary process of an example method for locating a target sub-control chart in a control chart incorporating teachings of the present disclosure.

FIG. 4 shows a flowchart of an exemplary process of a method 400 for locating a target sub-control chart in a control chart according to an embodiment of the present disclosure. The following describes the method with reference to FIG. 4. Before the method 400 is performed, a knowledge graph of the target physical world (such as a building (Building F)), and a control chart to which the knowledge graph is mapped have been constructed in advance.

Step S402: Receive natural language query information inputted by a user, and translate the natural language query information into semantic information. Herein, the natural language information inputted by the user is content that is related to a target operation of the user and that is inputted based on the entity included in the knowledge graph. The natural language query information may be voice information of the user or text information inputted on a user interface. The method according to the present disclosure imposes no limitation on a format of the input information. The natural language query information may be translated into the semantic information in known methods, such as a voice recognition method or a text recognition method. The teachings of the present disclosure also impose no limitation on the method of translating the natural language query information.

Step S404: Query at least one entity matching the semantic information in the knowledge graph of the target physical world.

Step S406: Determine at least one sub-control chart matching the at least one entity in the control chart to which the knowledge graph is mapped, where the sub-control chart herein includes at least one function block and a logical relationship between the function blocks.

The knowledge graph shown in FIG. 2 has only a single-layer model related to the room 202, and there is no further subdivision modeling. The knowledge graph is a single-layer knowledge graph. In the single-layer knowledge graph, all entities and logical relationships thereof are displayed on the same interface. The knowledge graph can also include a plurality of layers, and in this case, the knowledge graph is displayed hierarchically. When the knowledge graph is a single layer, the user can directly input query information related to the target operation, to determine, in the control chart, the sub-control chart including FBs related to realization of the target operation of the user. In this specification, when the determined sub-control chart includes the FBs related to the realization of the target operation of the user, it is also believed that the sub-control chart meets a requirement of the user.

When the knowledge graph includes a plurality of layers, the sub-control chart that meets the requirement of the user may not be determined through a single query, and the hierarchical query is required. In this case, the natural language query information inputted by the user for the first time is for information in a knowledge graph at the first layer. After receiving the query information, the knowledge graph can automatically proceed to the next layer. If the sub-control chart determined in step S406 does not meet the requirement of the user, the user inputs new query information again for query. In this case, the method 400 further includes: a cyclical control step S408. Step S408: Repeatedly perform step S402, step S404, and step S406 for the next layer of the knowledge graph until no query information is received.

When the determined sub-control chart meets the requirement of the user, the user no longer inputs the query information, and the target sub-control chart is found in the control chart in the method 400.

Figure 5:
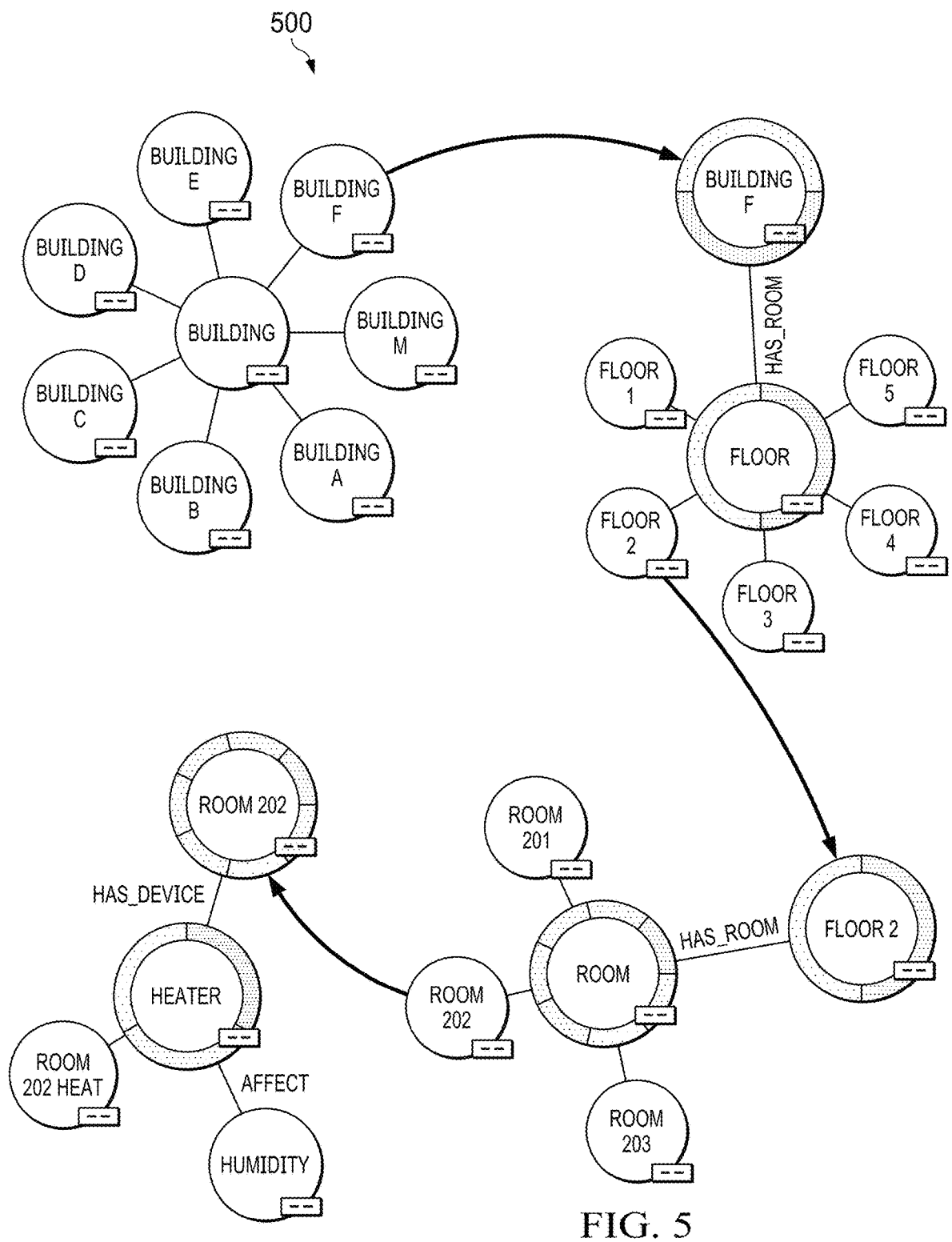
FIG. 5 is an exemplary diagram of a hierarchically displayed knowledge graph incorporating teachings of the present disclosure.

The following describes a specific example of locating the target sub-control chart in the method according to the present disclosure from the perspective of the user. For example, the user wants to adjust a parameter of a heater (Heater) in a room 202 (Room 202) on a floor 2 (Floor 2) of a building F (Building F). FIG. 5 is an exemplary diagram of a hierarchically displayed knowledge graph 500. The first layer includes entities of a building A, a building B, a building C, a building D, a building E, a building F, and the like. The user inputs the "building F" by using a text or a voice, and all FBs related to the building F are displayed in the control chart. The knowledge graph automatically proceeds to the second layer, and all entities related to the entity of the building F, such as a floor 1, a floor 2, a floor 3, a floor 4, a floor 5, and the like, are displayed. Then, the user can further input the "floor 2" based on the entities in the second layer of the knowledge graph, and all FBs related to the floor 2 are displayed in the control chart. The knowledge graph proceeds to the third layer, to display all entities related to the floor 2, such as a room 201, a room 202, a room 203, and the like; and then the user further inputs the "room 202", and all FBs related to the room 202 are displayed in the control chart. The knowledge graph proceeds to the fourth layer, to display all entities related to the entity of the room 202; and finally, the user inputs the "heater", all FBs related to the heater are displayed in the control chart, and the user confirms that the sub-control chart displayed at this time includes FBs related to the operation that is to be performed by the user, and then stops inputting. Through this process, a sub-control chart related to the heater in the room 202 is found in the control chart.

In some embodiments, the method 400 may further include: a function block displaying step S410. Step S410: Display the function blocks in the determined sub-control chart in a hierarchical structure.

Figure 6:
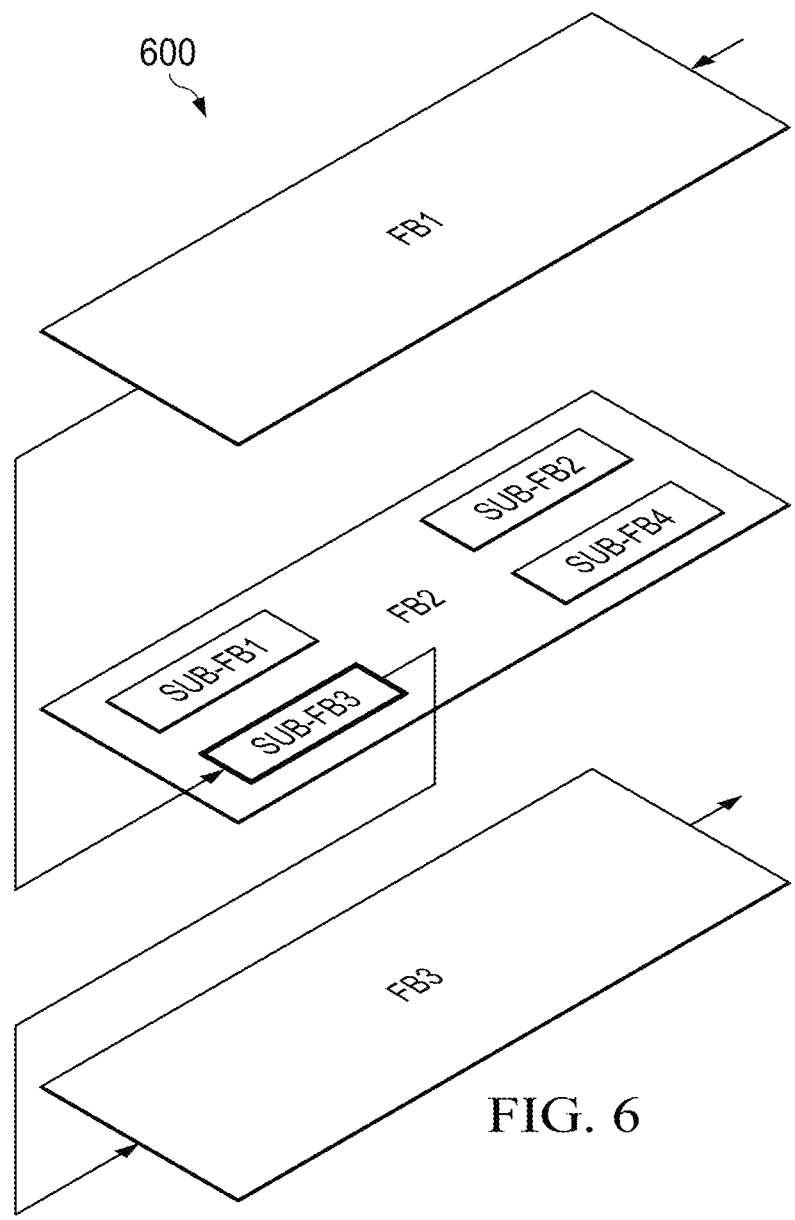
FIG. 6 is an exemplary diagram of a function block of a sub-control chart displayed in a hierarchical structure incorporating teachings of the present disclosure.

FIG. 6 is a schematic diagram of displaying, by using a hierarchical structure, FBs of a sub-control chart 600 determined in a method incorporating teachings of the present disclosure. As shown in FIG. 6, it is assumed that the determined sub-control chart includes sub-blocks of Sub-FB3 and FB3 of function blocks of FB1 and FB2, and the three FBs are FBs related to a target operation that is to be performed by the user. The function blocks are displayed by using the hierarchical structure shown in FIG. 6, to make the configuration and debugging operations of the FBs clearer and more intuitive.

The knowledge graph and the overall control chart in the engineering tool are mapped in the information processing method according to the present disclosure, to provide a simple, feasible, and efficient method for continuous development of the control chart. The natural language is used to query a database of the knowledge graph, a sub-control chart related to a to-be-performed development activity can be automatically found in the control chart, and in this way, the developer can efficiently locate a concerned sub-control chart in the development activity, and the developer can focus on the FB of the concerned sub-control chart without being interfered by another unrelated FB, thereby improving the efficiency of development and debugging of the control chart. In addition, the FB of the determined sub-control chart is displayed by using a hierarchical structure, so that the configuration and debugging activities can be clearer and more intuitive.

Figure 7:
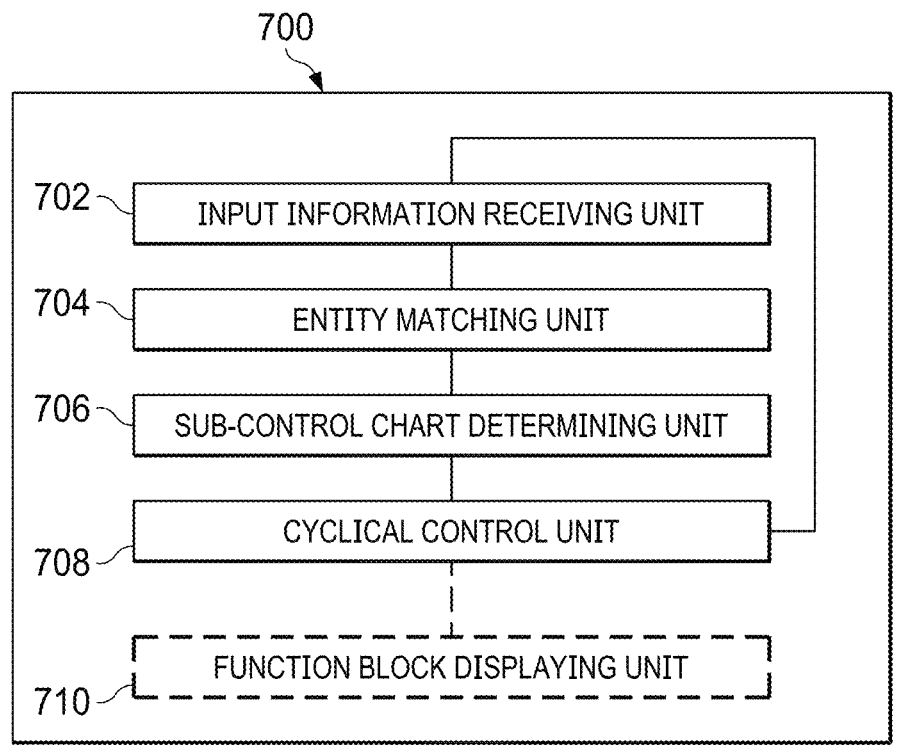
FIG. 7 is a block diagram of an exemplary configuration of an example apparatus for locating a target sub-control chart in a control chart incorporating teachings of the present disclosure.

FIG. 7 is a block diagram of an exemplary configuration of an apparatus 700 for locating a target sub-control chart in a control chart incorporating teachings of the present disclosure. As shown in FIG. 7, the apparatus 700 for locating a target sub-control chart in a control chart includes: an input information receiving unit 702, an entity matching unit 704, and a sub-control chart determining unit 706. The input information receiving unit 702 is configured to receive natural language query information inputted by a user, and translate the natural language query information into semantic information. The entity matching unit 704 is configured to query at least one entity matching the semantic information in a knowledge graph of a target physical world. The sub-control chart determining unit 706 is configured to determine a sub-control chart matching the at least one entity in a control chart to which the knowledge graph is mapped, where the sub-control chart includes at least one function block and a logical relationship between the function blocks.

When the determined sub-control chart does not meet a need of the user, the apparatus 700 further includes: a cyclical control unit 708, configured to control the input information receiving unit 702, the entity matching unit 704, and the sub-control chart determining unit 706 to perform an operation for a next layer of the knowledge graph until no query information is received. The natural language information includes voice information or text information.

The apparatus 700 further includes: a function block displaying unit 710, configured to display the function blocks in the determined sub-control chart in a hierarchical structure. It should be noted that, structures of the apparatus 700 for locating a target sub-control chart in a control chart and a component unit shown in FIG. 7 are only exemplary. A person skilled in the art can modify the structural block diagram shown in FIG. 7 as needed.

Details of operations and functions of various parts of the apparatus 700 for locating a target sub-control chart in a control chart can be, for example, the same as or similar to related parts of the embodiments of the method 100 for locating a target sub-control chart in a control chart in the present disclosure described with reference to FIG. 1 to FIG. 6. Details are not described herein again. As described above, the method and apparatus for locating a target sub-control chart in a control chart incorporating teachings of the present disclosure are described with reference to FIG. 1 to FIG. 7. Each unit of the foregoing apparatus for locating a target sub-control chart in a control chart may be implemented by using hardware, software, or a combination of hardware and software.

Figure 8:
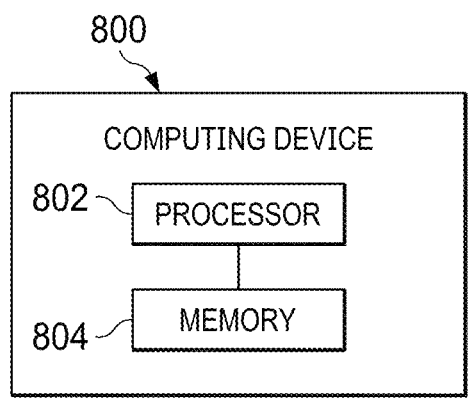
FIG. 8 is a block diagram of a computing device 800 for implementing locating of a target sub-control chart in a control chart incorporating teachings of the present disclosure.

FIG. 8 is a block diagram of a computing device 800 for implementing locating of a target sub-control chart in a control chart incorporating teachings of the present disclosure. The computing device 800 may include at least one processor 802. The at least one processor 802 executes at least one computer-readable instruction (i.e., the above elements implemented in a software form) stored or encoded in a computer-readable storage medium (i.e., memory 804).

It should be understood that, computer executable instructions stored in the memory 804, when executed, cause the at least one processor 802 to perform the various operations and functions described in the foregoing embodiments of the present disclosure with reference to FIG. 1 to FIG. 7.

In some embodiments, a non-transient machine-readable medium is provided. The non-transient machine-readable medium may be provided with machine executable instructions (that is, the foregoing elements implemented in a software form), and the instructions, when executed by a machine, cause the machine to perform the various operations and functions described in the foregoing embodiments of the present disclosure with reference to FIG. 1 to FIG. 7.

In some embodiments, a computer program includes computer-executable instructions, the computer-executable instructions, when executed, causing at least one processor to execute various operations and functions described with reference to FIG. 1 to FIG. 7 in the foregoing embodiments of the present disclosure.

In some embodiments, a computer program product includes computer-executable instructions, the computer-executable instructions, when executed, causing at least one processor to execute various operations and functions described with reference to FIG. 1 to FIG. 7 in the foregoing embodiments of the present disclosure.

It can be understood that, the embodiments of this specification are all described in a progressive manner, for same or similar parts in the embodiments, refer to these embodiments, and descriptions of each embodiment focus on a difference from other embodiments. For example, of embodiments the apparatus, embodiments of the computing device, and embodiments of the machine-readable storage medium are basically similar to the method embodiments, and therefore are described briefly. For related parts, refer to partial descriptions in the method embodiments.

The foregoing describes specific embodiments of this specification. Other embodiments fall within the scope of the appended claims. In some cases, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

Not all steps and units in the procedures and the diagrams of the system structures are necessary, and some steps or units may be omitted according to an actual requirement. The apparatus structure described in the embodiments may be a physical structure or a logical structure. That is, some units may be implemented by the same physical entity, or some units may be implemented by a plurality of physical entities, or may be implemented by some components in a plurality of independent devices together.

Exemplary embodiments are described above in combination with specific implementations illustrated in the accompanying drawings, but this does not represent all embodiments that may be implemented or fall within the protection scope of the claims. A term "exemplary" used in the entire specification means "used as an example, an instance, or an illustration", and does not mean "preferred" or "superior" over other embodiments. To provide an understanding of the described technologies, the specific implementations include specific details. However, these technologies may be implemented without these specific details. In some embodiments, to avoid confusing the concept of the described embodiments, a well-known structure and apparatus are shown in a block diagram form.

The descriptions of the content of the present disclosure are provided to allow any person of ordinary skill in the art to implement or use the content of the present disclosure. For a person of ordinary skill in the art, various modifications on the content of the present disclosure are obvious. In addition, a general principle defined in this specification may be applied to other variants without departing from the protection scope of the content of the present disclosure. Therefore, the content of the present disclosure is not limited to the examples and designs described in this specification, but is consistent with the widest range conforming to the principle and novelty disclosed in this specification.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An information processing method comprising:
constructing a knowledge graph of a target physical world, the knowledge graph including one or more entities;
constructing a control chart of the target physical world, the control chart including a plurality of function blocks; and
adding annotation information to each function block in the control chart, and establishing one-to-one mapping between individual function blocks in the control chart and the one or more entities in the knowledge graph, to establish mapping between the control chart and the knowledge graph.

2. A method for locating a target sub-control chart in a control chart including a plurality of function blocks, the method comprising:
receiving natural language query information from a user, and translating the natural language query information into semantic information;
querying at least one entity matching the semantic information in a knowledge graph of a target physical world, wherein the knowledge graph is mapped to the control chart; and
determining a particular sub-control chart corresponding to the at least one entity in the control chart, wherein the particular sub-control chart comprises at least one of the plurality of function blocks and a logical relationship between the individual function blocks of the plurality of function blocks.

3. The method according to claim 2, further comprising when the determined sub-control chart does not meet a need of the user, receiving another input from the user, querying another entity, and determining another sub-control chart for a next layer of the knowledge graph until no query information is received.

4. The method according to claim 2, wherein the natural language information comprises voice information or text information.

5. The method according to claim 2, further comprising displaying the at least one of the plurality of function blocks in the determined sub-control chart in a hierarchical structure.

6. An apparatus for locating a target sub-control chart in a control chart including a plurality of function blocks, the apparatus comprising:
an input information receiving unit to receive natural language query information from a user, and translate the natural language query information into semantic information;
an entity matching unit to query at least one entity matching the semantic information in a knowledge graph of a target physical world, wherein the knowledge graph is mapped to the control chart; and
a sub-control chart determining unit to determine a particular sub-control chart corresponding to the at least one entity in the control chart, wherein the particular sub-control chart comprises at least one of the plurality of function blocks and a logical relationship between the individual function blocks of the plurality of function blocks.

7. The apparatus according to claim 6, further comprising a cyclical control unit to control the input information receiving unit, the entity matching unit, and the sub-control chart determining unit to perform an operation for a next layer of the knowledge graph until no additional query information is received.

8. The apparatus according to claim 6, wherein the natural language information comprises voice information or text information.

9. The apparatus according to claim 6, further comprising a function block displaying unit to display the at least one of the plurality of function blocks in the determined sub-control chart in a hierarchical structure.

10. A computing device comprising:
at least one processor; and
a memory coupled to the at least one processor, the memory storing instructions, the instructions, when executed by the at least one processor, causing the at least one processor to:

receive natural language query information from a user, and translate the natural language query information into semantic information;

query at least one entity matching the semantic information in a knowledge graph of a target physical world, the knowledge graph mapped to a control chart; and determine a sub-control chart corresponding to the at least one entity in the control chart, wherein the sub-control chart comprises at least one function block of a plurality of function blocks and a logical relationship between individual blocks of the plurality of function blocks.

\* \* \* \* \*